United States Patent [19]
Sanderson et al.

[11] Patent Number: 5,923,029
[45] Date of Patent: Jul. 13, 1999

[54] NARROW BAND OPTICAL RADIATION SENSOR USING PYROELECTRIC MATERIAL

[75] Inventors: Thomas R. Sanderson, Issaquah, Wash.; Richard C. Benson, Highland, Md.; Terry E. Phillips, Ellicott CIty, Md.; Joseph J. Suter, Clarksville, Md.; Jay C. Poret, Kingstowne, Va.

[73] Assignee: The United States of America as represented by the Secretary of the Air Force, Washington, D.C.

[21] Appl. No.: 08/935,006

[22] Filed: Sep. 22, 1997

[51] Int. Cl.⁶ .................................................... G01J 5/12
[52] U.S. Cl. .................. 250/214 R; 250/332; 250/338.2
[58] Field of Search ............................. 25/214 R, 214 A, 25/332, 338.2, 338.3, 338.4, 342, 349

[56] References Cited

U.S. PATENT DOCUMENTS

| | | | |
|---|---|---|---|
| 4,379,971 | 4/1983 | Smith et al. ............................. | 250/342 |
| 4,906,849 | 3/1990 | Duo et al. ............................. | 250/338.3 |
| 5,030,827 | 7/1991 | Powell ..................................... | 250/349 |
| 5,746,930 | 5/1998 | Belcher et al. ......................... | 250/332 |

*Primary Examiner*—Stephone Allen
*Attorney, Agent, or Firm*—Robert L. Nathans

[57] ABSTRACT

A pair of interleaved finger-like electrodes are positioned over a pyro-electric sheet of polyvinylidine fluoride and a pair of coatings are formed upon the electrodes having different optical reflectance, and as a result, a light beam energy absorption differential will be produced between the coatings and the resulting change in temperature in the sheet material under the electrodes will cause a voltage to be generated. A differential amplifier is connected across the electrodes to sense this voltage, indicative of the detection of an incoming laser light beam. A light chopper is positioned to interrupt the light beam directed at a portion of the pyro-electric sheet.

20 Claims, 2 Drawing Sheets

NARROW BAND OPTICAL RADIATION SENSOR USING PYROELECTRIC MATERIAL

STATEMENT OF GOVERNMENT INTEREST

The invention described herein may be manufactured and used by or for the Government for governmental purposes without the payment of any royalty thereon.

BACKGROUND OF THE INVENTION

The present invention relates to radiation sensors and more particularly to sensors for detecting the presence of laser beams.

It is important to warn persons being targeted by laser beam radiation, such as infra-red radiation, that they are in fact being targeted. Such laser beams can be directed at targeted individuals by laser weapons systems and electronic eavesdropping apparatus using lasers and employed by adversaries in carrying out military and espionage activities respectively. There is a need for an improved sensor device for rapidly sensing such laser light over a broad bandwidth. Such device should produce an output warning signal regardless of the incident angle of illumination of the threatening laser beam, and thus be independent of the angle of incidence. There is also a need for such a laser beam detection device which ideally is cheap to manufacture, and which is robust and can be very broadband to rapidly detect any incoming radiation of interest without delay. In combat situations, there is no time to determine the illumination wavelength of the light beam projected by an adversary at its target.

BRIEF SUMMARY OF THE INVENTION

In accordance with a preferred embodiment of the invention, a pair of interleaved finger-like electrodes are positioned upon a pyro-electric sheet, and a pair of coatings are formed upon the electrodes having different optical reflectivity, and as a result, a light beam energy absorption differential can be produced between the coatings, and the resulting change in temperature in the sheet material under the electrodes will cause a voltage to be generated. A differential amplifier is connected across the electrodes to sense this voltage, indicative of the detection of an incoming laser light beam within a wavelength band of interest. More specifically, the coatings can be tailored to have different reflectivity's or absorption coefficients for a specific optical radiation band of interest. When optical radiation interacts with the coatings, a non-equilibrium charge distribution, caused by the thermal differential, is converted to the sensed differential voltage.

BRIEF DESCRIPTION OF THE DRAWINGS

Other features and advantages of the invention will become more apparent upon study of the following description, taken in conjunction with the drawings in which.

DETAILED DESCRIPTION OF PREFERRED EMBODIMENTS OF THE INVENTION

Polyvinylidene fluoride (PVDF) is a long chain, semi-crystalline polymer with the repeat units of CH2-CF2. Due to its crystalline structure, it is both piezo-electric and pyro-electric. Pyro-electricity, which is of primary interest in connection with this invention, is defined as an electric polarization produced by thermal absorption. When this material is exposed to thermal energy, the electric dipoles in the material are forced to shift from equilibrium orientations, causing the net charge distribution to change within the material. If two electrodes are attached to a film of PVDF, an electrical potential develops between the two electrodes due to the dipole shifting, and when the circuit is closed, a transient but detectable current flows in order to reestablish electrical neutrality. Thus the PVDF can act as a dynamic thermal sensor which can produce a transient signal to be detected, amplified and used, for example, to trigger a flip/flop to act as a beam detection output signal, although such an approach is less preferred than the use of a modulated beam to be described.

Figure 1:
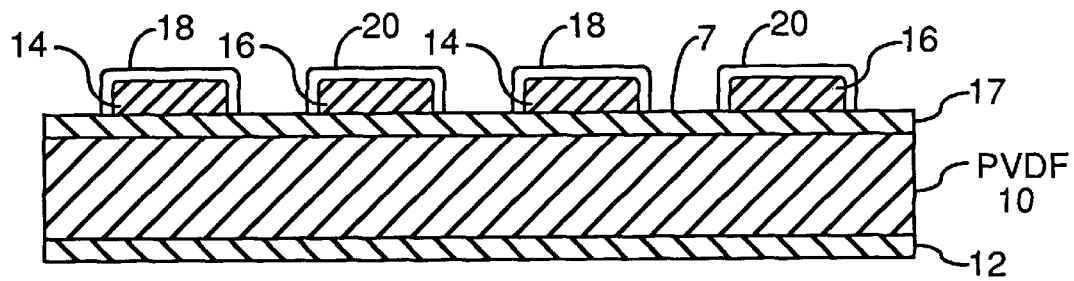
FIG. 1 illustrates a sectional view A—A taken through FIG. 2.
Figure 2:
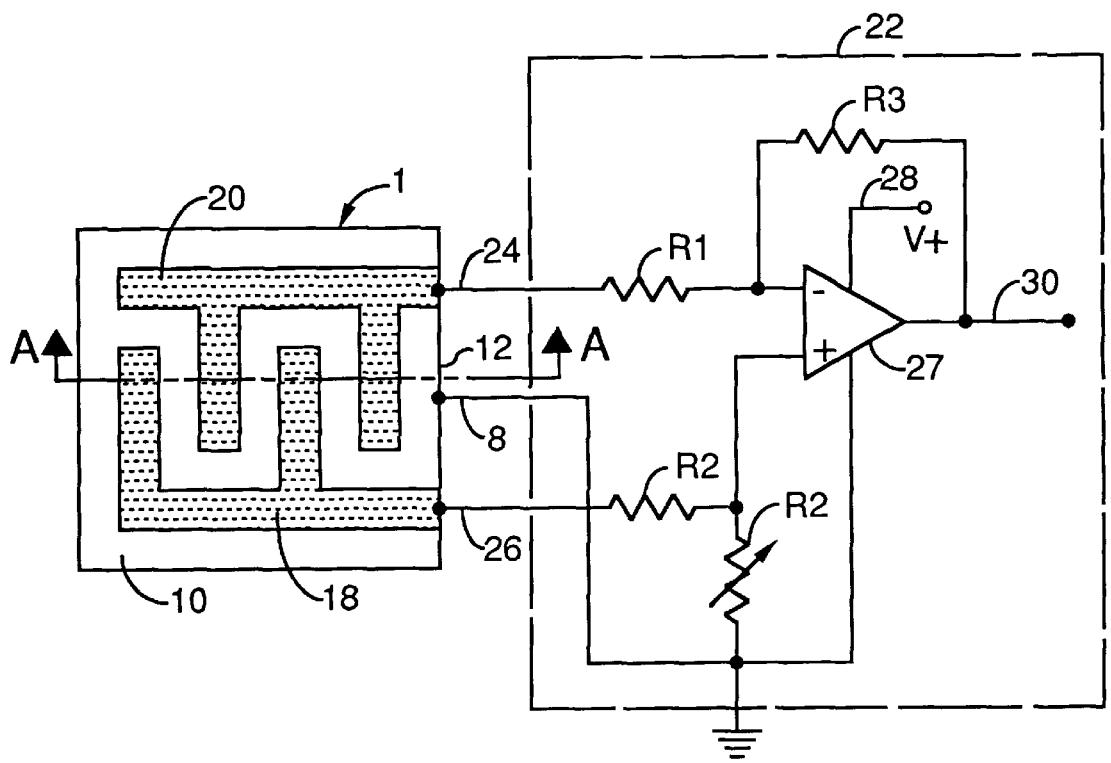
FIG. 2 schematically illustrates an embodiment of the invention.

Referring now to FIGS. 1 and 2, a laser beam detector 1 comprises a sheet of pyro-electric PVDF film 10, with a lower surface or back side 12 of partially or fully metallized base material and an upper surface having two interleaved finger-like metallic patterns thereon. A first electrode pattern consists of metallic fingers 14 interleaved with metallic fingers 16 of the second electrode pattern, both on the upper silicon surface 17 of PVDF film 10. Fingers 14 are coated with a first coating 18 having a predetermined reflectivity, and fingers 16 are coated with a second coating 20 having a second reflectivity greater than the reflectivity of the first coating. Ideally, the only difference between coatings 18 and 20 is that one is significantly more reflective to IR radiation than the other over a particular frequency range, which range includes the frequency of the laser beams to be detected. These coatings may be organics, metals, semiconductors or dielectrics, as long as they have the requisite optical properties, and have similar thermal conductivity's and thermal masses.

Optical coatings 18 and 20, functioning as light energy absorption members, could be organic color coatings such as red and blue paint respectively. When a HeNe laser beam simultaneously strikes the two coatings 18 and 20, the heat generated at the blue coating 20 is greater than the heat generated adjacent the red coating 18 because the blue coating absorbs more of the red or infra-red laser beam energy than does the red coating. The resulting temperature difference will cause PVDF pyro-electric film 10 to generate a differential voltage potential which is amplified by amplification unit 22 coupled to beam detector 1, via input leads 8, 24 and 26 as shown in FIG. 2. Unit 22 includes a differential amplifier 27 coupled to potential terminal 28 and resistors R1, R2, R3, and R4 in accordance with conventional amplifier design. Ground lead 8 is connected to metallic base coating 12, while leads 24 and 26 are coupled to the first and second electrodes consisting of metallic fingers 14 and 16 respectively. In sum, this arrangement could provide a narrow band detection unit whereby thermal differentiation beneath the two finger patterns in the pyro-electric PVDF material would be produced by radiation within the band of interest, to in turn produce a detectable voltage differential across the electrodes.

We evaluated the wavelength sensitivity of PVDF sheet material having silicon on one side and a nickel/aluminum alloy on the other. Both sides of the PVDF material were exposed to 450–1600 nanometer radiation. The silicon coating exposed to the radiation was very responsive to wavelengths of between 450–850 nanometers. Longer wavelengths of between 870–1600 nanometers produced a smaller but still measurable response from the silicon coated PVDF film. This broadband response is important in combat situations where there is no time to evaluate the wavelengths of incoming laser radiation produced by an adversary.

The response of the PVDF material was substantially less when illuminated through the alloy surface, which was most likely due to the absorption of the Si being much higher than the Ni/Al alloy in the 400–1600 nanometer range due to the presence of absorption bands at these wavelengths. It was also found that the PVDF response was linearly related to the power of the incident radiation and was smaller for lesser power levels.

Figure 3:
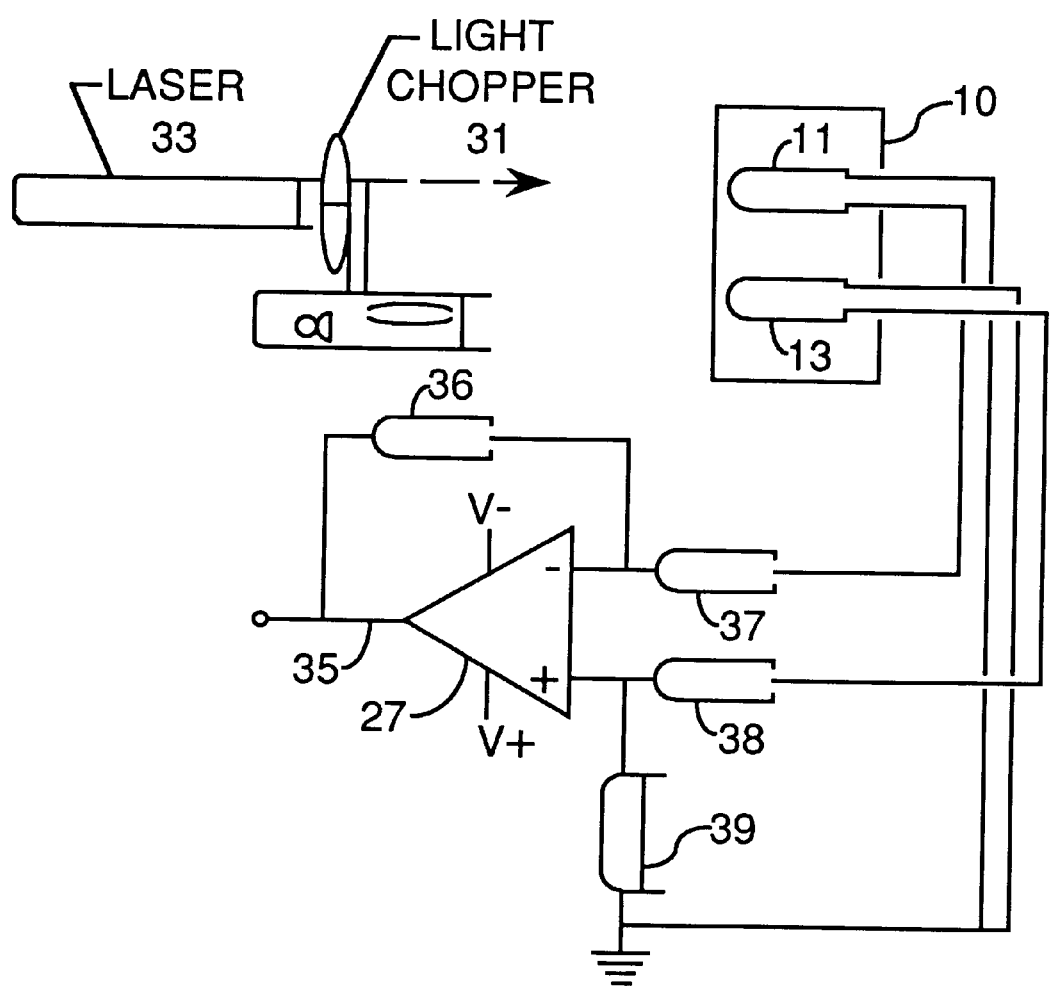
FIG. 3 schematically illustrates an aspect of our experimental setup employing a light chopper.

We currently believe that the incoming radiation beam, which could possibly be a steady state uninterrupted beam, should be modulated or chopped since the PVDC sensor response to illumination is dynamic and transient rather than static. We thus used an experimental setup similar to the schematically shown apparatus of FIG. 3, illustrating a pair of two terminal PVDC sensors 11 and 13, having the aforesaid first and second electrodes respectively, positioned upon PVDF sheet 10, and one of which is exposed to a chopped or interrupted light beam produced by chopper 31. Laser 33 illuminates the surface of one PVDC sensor 11, and the sensor outputs are coupled to an AD741 operational amplifier 27, operating in a differential mode. As a result, since background radiation will impinge upon both sensors, such background noise will be eliminated from the amplifier output at 35. The amplifier should be configured for unitary gain whereby resistors 36, 37, 38 and 39 are all one megohm. This is because the PVDC material has extremely high resistance which makes use of lower valued resistors impractical. Our tests showed that as the chopping frequency of the beam increased, the response decreased. Also, importantly, we found that the PVDC response did not significantly vary with incident angle of the incoming laser beam to be detected. For a real world device deployed in the field, the chopper could be replaced by a solid state electro-optical modulator having no moving parts, and known to workers in the art. Laser beam illumination systems employ modulated beams to detect targets because AC detection systems are easier to develop than DC systems. It may therefor not be necessary to incorporate a modulation system in our device in order to chop the already modulated beam incoming from an adversary.

Since variations on the foregoing will be readily apparent to skilled workers in this art, the scope of the invention is to be limited solely by the terms of the following claims and art recognized equivalents.

What is claimed is:

1. An electromagnetic radiation sensor for sensing radiation beams within a wavelength band of interest comprising:
   (a) a sheet of pyro-electric material having an upper surface and a lower surface;
   (b) first electrode means in contact with the upper surface of said sheet together with a second electrode means, separate from aid first electrode means, in contact with said upper surface;
   (c) first and second coatings having different electromagnetic beam reflectivity with respect to different radiation beams within said band of interest coated over said first and second electrode means respectively; and
   (d) amplifier means including a differential amplifier electrically coupled across said first and second electrode means for producing a beam detection output signal upon the production of different temperatures under said first and second electrode means due to illumination thereof by said radiation beams.

2. The sensor of claim 1 wherein said pyro-electric material comprises polyvinylidene fluoride.

3. The sensor of claim 1 wherein said first and second electrode means comprise interleaved electrically conductive finger patterns.

4. The sensor of claim 2 wherein said first and second electrode means comprise interleaved electrically conductive finger patterns.

5. The sensor of claim 1 wherein said pyro-electric material is coated with silicon.

6. The sensor of claim 2 wherein said polyvinylidene fluoride is coated with silicon.

7. An electromagnetic radiation sensor for sensing radiation beams within a wavelength band of interest comprising:
   (a) a body of pyro-electric material having a first and second portion;
   (b) first electrode means in contact with the first portion of said body together with a second electrode means, separate from said first electrode means, in contact with the second portion of said body;
   (c) first and second coatings having different electromagnetic beam reflectivity with respect to different radiation beams within said band of interest positioned over said first and second electrode means respectively; and
   (d) amplifier means electrically coupled to said first and second electrode means for producing a beam detection output signal upon the production of different temperatures under said first and second electrode means due to illumination thereof by said radiation beams.

8. The sensor of claim 7 wherein said pyro-electric material comprises polyvinylidene fluoride.

9. The sensor of claim 7 wherein said first and second electrode means comprise interleaved electrically conductive finger patterns.

10. The sensor of claim 8 wherein said first and second electrode means comprise interleaved electrically conductive finger patterns.

11. The sensor of claim 7 wherein said pyro-electric material is coated with silicon.

12. The sensor of claim 8 wherein said polyvinylidene fluoride is coated with silicon.

13. The sensor of claim 1 including a beam chopper for interrupting beams directed at said first electrode means.

14. The sensor of claim 7 including a beam chopper for interrupting beams directed at said first electrode means.

15. The sensor of claim 11 including a beam chopper for interrupting beams directed at said first electrode means.

16. The sensor of claim 12 including a beam chopper for interrupting beams directed at said first electrode means.

17. An electromagnetic radiation sensor for sensing radiation beams within a wavelength band of interest comprising:
   (a) a body of pyro-electric material having a first and second portion;
   (b) first electrode means in contact with the first portion of said body of pyro-electric material together with second electrode means in contact with the second portion of said body; and
   (c) first and second energy absorbing members having different electromagnetic beam reflectance with respect to radiation beams within said band of interest, positioned over said first and second electrode means respectively, enabling the production of a detectable voltage across the first and second electrode means upon being illuminated by radiation beams within said band of interest.

18. The sensor of claim 17 wherein said pyro-electric material comprises polyvinylidene fluoride.

19. The sensor of claim 17 wherein said first and second electrode means are interleaved.

20. The sensor of claim 17 wherein said first and second energy absorbing members are coated upon said first and second electrode means respectively.

* * * * *